(12) United States Patent
Navarro et al.

(10) Patent No.: US 11,239,665 B2
(45) Date of Patent: Feb. 1, 2022

(54) GRID-EDGE CONTROLLERS FOR UNINTERRUPTIBLE POWER SUPPLIES AND METHODS OF OPERATING THE SAME

(71) Applicant: Eaton Intelligent Power Limited, Dublin (IE)

(72) Inventors: George Arthur Navarro, Raleigh, NC (US); Vincent Edward Wilder, Clayton, NC (US); Swanand Juvekar, Morrisville, NC (US); Webb Lewis Burgess, Raleigh, NC (US)

(73) Assignee: Eaton Intelligent Power Limited

( * ) Notice: Subject to any disclaimer, the term of this patent is extended or adjusted under 35 U.S.C. 154(b) by 0 days.

(21) Appl. No.: 16/798,898

(22) Filed: Feb. 24, 2020

(65) Prior Publication Data

US 2020/0274367 A1    Aug. 27, 2020

Related U.S. Application Data

(60) Provisional application No. 62/810,100, filed on Feb. 25, 2019.

(51) Int. Cl.
*H02J 3/46* (2006.01)
*H02J 3/28* (2006.01)
*H02J 3/18* (2006.01)

(52) U.S. Cl.
CPC ............ *H02J 3/466* (2020.01); *H02J 3/28* (2013.01); *H02J 3/1892* (2013.01)

(58) Field of Classification Search
None
See application file for complete search history.

(56) References Cited

U.S. PATENT DOCUMENTS

2010/0076615 A1\* 3/2010 Daniel ............... H02J 3/28
700/293
2013/0166081 A1\* 6/2013 Sanders ............. G05B 15/02
700/286

(Continued)

FOREIGN PATENT DOCUMENTS

WO   WO 2008/015502       2/2008
WO   WO 2013/152397      10/2013
WO   WO-2013152397 A1 \* 10/2013 ............ H02J 7/022

OTHER PUBLICATIONS

Notification of Transmittal of International Search Report and Written Opinion; corresponding application No. PCT/EP2020/025093; dated Apr. 6, 2020.

*Primary Examiner* — Jared Fureman
*Assistant Examiner* — Joel Barnett
(74) *Attorney, Agent, or Firm* — Stanek Lemon Crouse & Meeks, P.A.

(57) ABSTRACT

A system includes an uninterruptible power supply (UPS) configured to selectively provide power to a critical load from a grid and an energy storage device, and a grid edge controller configured to communicate with a controller of the UPS and to cause the UPS to operate the energy storage as a distributed energy resource (DER) for the grid while preserving autonomous operation of the UPS to serve the critical load. The grid edge controller may be configured, for example, to maintain a critical reserve in the energy storage device that enables the UPS to maintain the critical load, while allowing the energy storage device to also be used for demand management, frequency regulation and other grid-oriented tasks. The grid edge controller may be configured to control the UPS, for example, via an application programming interface (API) of the controller of the UPS.

20 Claims, 6 Drawing Sheets

(56) References Cited

U.S. PATENT DOCUMENTS

| | | |
|---|---|---|
| 2014/0368042 A1 | 12/2014 | Giuntini et al. |
| 2015/0142201 A1 | 5/2015 | Forbes, Jr. |
| 2016/0013652 A1* | 1/2016 | Li ................... H02J 9/061 |
| | | 307/24 |
| 2018/0006964 A1* | 1/2018 | Joppa .............. H04L 67/12 |

* cited by examiner

FIG. 6

GRID-EDGE CONTROLLERS FOR UNINTERRUPTIBLE POWER SUPPLIES AND METHODS OF OPERATING THE SAME

CROSS-REFERENCE TO RELATED APPLICATION

The present application claims the benefit of U.S. Provisional Patent Application Ser. No. 62/810,100 entitled "Grid-Aware UPS System," filed Feb. 25, 2019 and incorporated herein by reference in its entirety.

BACKGROUND

The inventive subject matter relates to uninterruptible power systems (UPSs) and methods of operating the same and, more particularly, to grid-connected UPSs and methods of operating the same.

Datacenter customers typically want an uninterruptible power supply (UPS) solution that offers power quality and critical power backup required of their mission critical operations. Increasingly, however, they may also want an advanced UPS that can provide energy ancillary services, such as demand response in the form of peak shaving and frequency regulation. Such capabilities can allow the customer to use previously untapped and inaccessible battery capacity, which can improve return on investment (ROI) in equipment and a reduction of total cost of operation (TCO).

SUMMARY

Some embodiments of the inventive subject matter provide a system including an uninterruptible power supply (UPS) configured to selectively provide power to a critical load from a grid and an energy storage device, and a grid edge controller configured to communicate with a controller of the UPS and to cause the UPS to operate the energy storage as a distributed energy resource (DER) for the grid while preserving autonomous operation of the UPS to serve the critical load. The grid edge controller may be configured, for example, to maintain a critical reserve in the energy storage device that enables the UPS to maintain the critical load, while allowing the energy storage device to also be used for demand management, frequency regulation and other grid-oriented tasks. The grid edge controller may be configured to control the UPS, for example, via an application programming interface (API) of the controller of the UPS.

According to further aspects, the grid edge controller may include a user interface configured to enable a user to set criteria for the grid edge controller operating the energy storage device as a DER. For example, the user interface may include at least one web page configured to accept at least one user setting for at least one SOC-based threshold for operation of the energy storage device as a DER. In some embodiments, the user interface may include at least one web page configured to accept user settings for a schedule for using the energy storage device as a DER.

Some embodiments provide a system including an uninterruptible power supply (UPS) configured to selectively provide power to a critical load from a grid and an energy storage device and a grid edge controller configured to communicate with a controller of the UPS and to cause the UPS to autonomously maintain continuous power to the load from the grid and the energy storage device and to selectively transfer power between the grid and energy storage device responsive to a grid control input depending on a state of charge (SOC) of the energy storage device. The grid control input may include a grid operator command and/or an operating parameter of the grid. The grid edge controller may be configured to prevent use of the energy storage device as a DER for the grid responsive to the SOC meeting a predetermined criterion, such as a SOC corresponding to a critical reserve needed to support UPS operation. The grid edge controller may be configured to provide a user interface that provides control of the criterion.

Further embodiments provide methods including a UPS autonomously operating to selectively provide power to a critical load from a grid and an energy storage device and thereby maintain the critical load, and a grid edge controller selectively interacting with a controller of the UPS to operate the energy storage device as a DER for the grid based on a state of charge (SOC) of the energy storage device. The grid edge controller selectively interacting with the controller of the UPS may include maintaining a critical reserve in the energy storage device to enable the UPS to maintain the critical load. The grid edge controller selectively interacting with the controller of the UPS may include the grid edge controller communicating with the UPS via an application programming interface (API) of the controller of the UPS. The grid edge controller selectively interacting with the controller of the UPS may include the grid edge controller causing the UPS to support frequency regulation and demand response.

In some embodiments, the grid edge controller selectively interacting with the controller of the UPS may include the grid edge controller causing the UPS to autonomously maintain continuous power to the load from the grid and the energy storage device and to selectively transfer power between the grid and energy storage device responsive to a grid control input depending on a state of charge (SOC) of the energy storage device. The grid control input may include a grid operator command and/or an operating parameter of the grid.

DETAILED DESCRIPTION

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like items. It will be understood that when an item is referred to as being "connected" or "coupled" to another item, it can be directly connected or coupled to the other item or intervening items may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, items, and/or components, but do not preclude the presence or addition of one or more other features, integers, steps, operations, items, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

Figure 1:
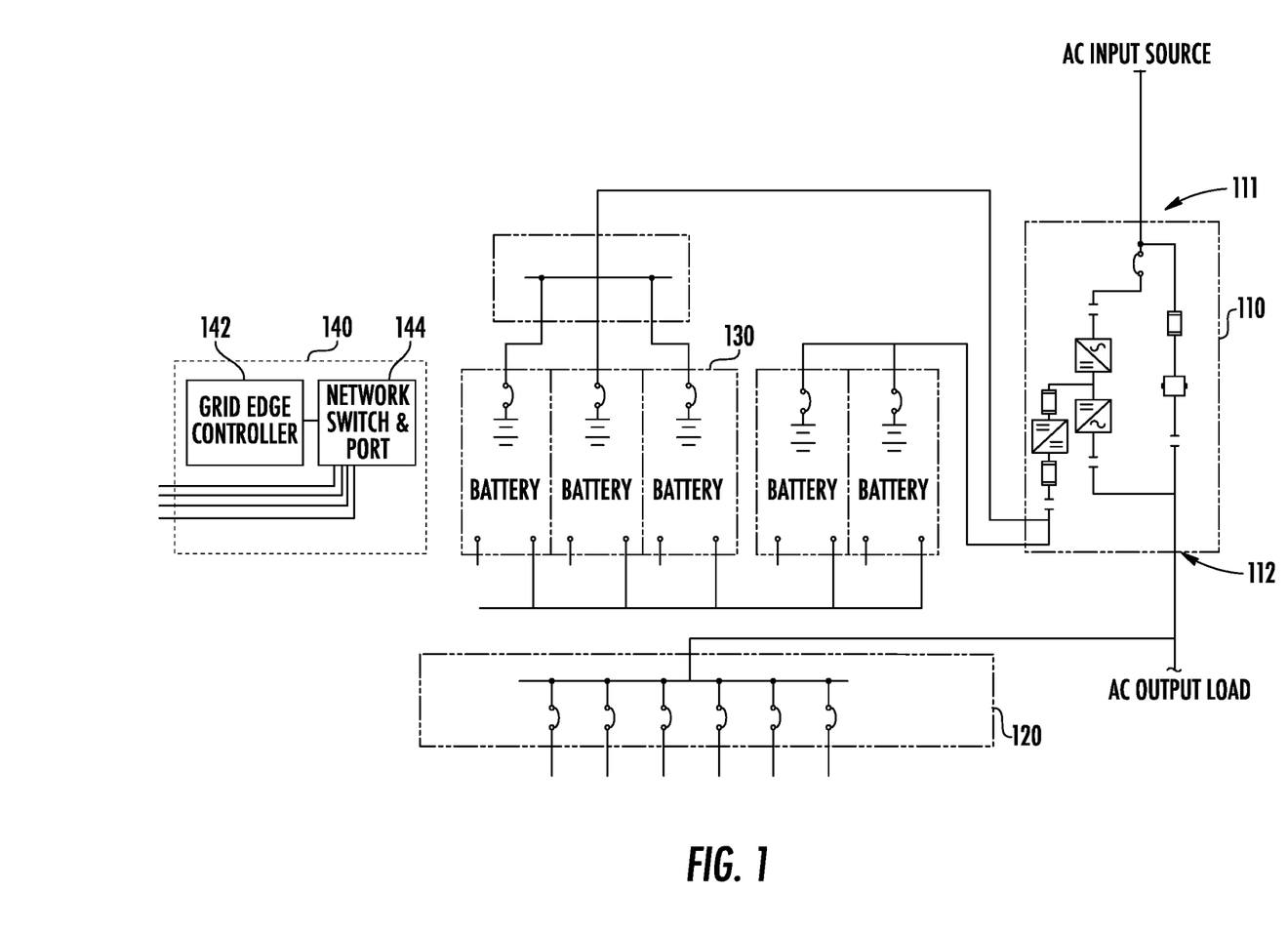
FIG. 1 is schematic diagram illustrating a system with a UPS and grid edge controller according to some embodiments.

FIG. 1 illustrates an exemplary system for enabling a UPS 110 to be used as such DER. The UPS 110 has its input 111 coupled to an AC grid and is configured to serve a critical load coupled to its output 112 via, for example, a power distribution unit (PDU) 120. A bank of batteries 130 is coupled to the UPS 110 and is used to support the critical load when power from the grid is interrupted or degraded.

According to some embodiments, the UPS 110 may be enabled as a DER using a grid edge controller 140, which can implement an energy control regime that supports energy ancillary services, such as peak shaving and frequency control, while leaving the UPS 110 to continue to operate autonomously as a critical backup power source for IT or the critical load. The grid edge controller 140 includes a grid edge controller 142 that communicates with a controller API in the UPS 110 via, for example, a network switch 144. The grid edge controller 142 may support network connectivity to allow configuration of the controller 140 to provide certain ancillary energy services using the UPS 110.

For example, the grid edge controller 142 may implement an operational schedule for the UPS 110 that operates the UPS 110 to provide grid ancillary services in various modes dependent on the time of day. For example, the schedule may cause the grid edge controller 142 to operate the UPS in a peak shaving mode for a particular time of day, causing the UPS 110 to deliver power from the battery bank 120 to the load to limit the amount of power the UPS 110 draws from the grid during the subject time period. Support of such a scheduled operation may include causing the UPS 110 to previously charge the battery bank 120 to a level appropriate for supporting the peak shaving operation, which may be a capacity at or near the maximum available for the battery bank 120. Such charging may occur, for example, during a preceding lower period of lower energy rates (or off-peak period), such as during the night or periods of low energy congestion on the grid.

In another example, the control schedule for the grid edge controller 142 may also include period in which the UPS is to operate in a frequency regulation mode. In such a mode, the UPS 110 may source and sink power to the grid operator to compensate for frequency variation on the grid. In contrast to the peak shaving mode, before operating in the frequency regulation mode, the grid edge controller 142 may cause the UPS 110 to take the battery bank 120 to a state of charge (SOC) that may be approximately half the maximum capacity of the battery bank 120 to enable the battery bank 120 to effectively source and sink power in turn maximum the time the UPS participates in this grid ancillary service.

According to further aspects, the grid edge controller 142 may also provide a grid security compliant interface for using the UPS 110 as a DER. In some retrofit applications, for example, the UPS 110 may be a UPS manner that was not designed to be coupled to the grid control network and may not be grid security compliant to prevent or reduce the likelihood of intrusions. The grid edge controller 142 may employ hardware and software that is compliant with security requirements of the grid, thus allowing the UPS 110 to be safely used with the grid in a DER application.

According to further aspects, the grid edge controller 142 may also provide a user interface to allow a UPS customer to monitor and control the schedule implemented by the grid edge controller 142, as well as parameters used by the grid edge controller 142, such as mapping of the capacity of the battery bank 120 for critical power and ancillary services. For example, FIG. 2 illustrates a web page that may be hosted by the grid edge controller 142, providing a dashboard that informs the customer of the state of the system and its constituent parts, including the current mode of the UPS 110, the current state of charge (SOC) of the battery bank and its current capacity allocation, input and output power meters and a current mode of the grid edge controller 142.

Figure 2:
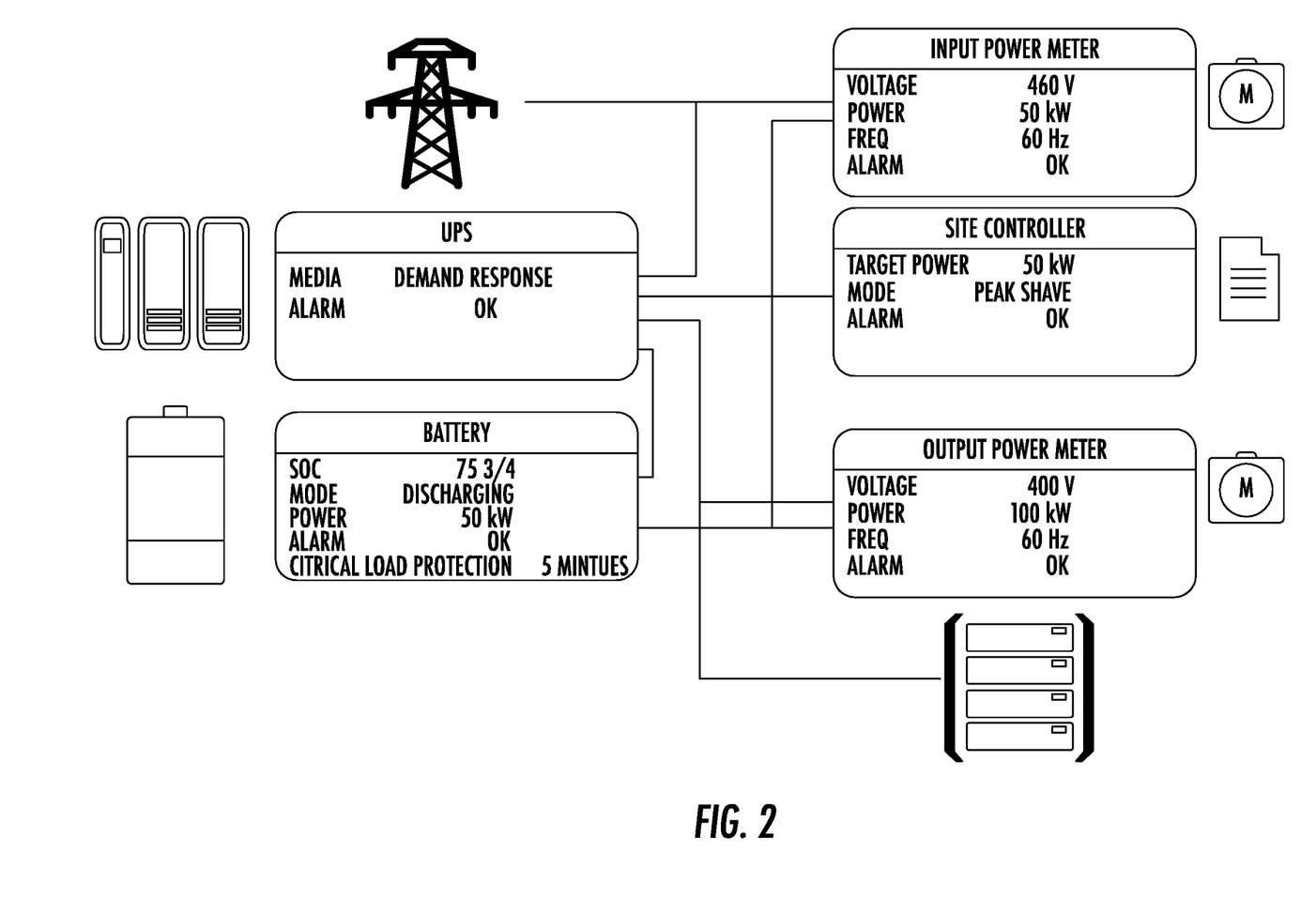
FIGS. 2-4 illustrate web pages of a grid edge controller user interface according to some embodiments.
Figure 3:
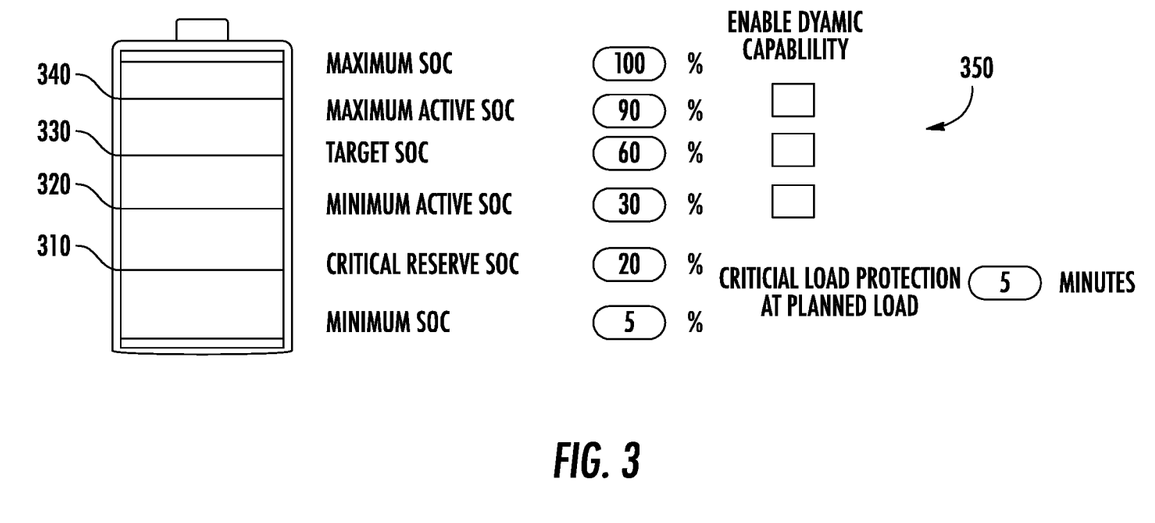

FIG. 2 illustrates a web page that indicates status of UPS and associate energy storage battery, indicating, for example, the mode in which the UPS is operating, the state of charge of the battery and its mode of operation, and the states of various input and output parameters monitored by the grid edge controller 142. FIG. 3 illustrates a web page hosted by the grid edge controller 142 that may be used by the customer to set or allocate battery capacity for critical power and energy ancillary services. As shown, for example, the customer can set a critical reserve state of charge (SOC) threshold 310, which represents the minimum capacity needed to ensure that the critical load may be served for a specified amount of time, here shown as five minutes. The grid edge controller 142 may be programmed to ensure that the battery bank SOC never falls to this level under normal (non-emergency) operation. To help preserve the critical reserve, the customer may set a higher minimum active SOC level 320 that can serve as a threshold for disabling ancillary energy services, i.e., if the battery bank SOC falls below this level, the services may be discontinued. Similarly, the customer may establish a maximum active SOC 330, which may serve as a threshold for disabling active services, such as frequency regulation, that might cause the battery bank to exceed this level. The customer may also establish a maximum SOC 340, representing a threshold that reduces the likelihood of overcharging, and a minimum SOC, to reduce the likelihood of overly deep discharging of the battery bank. Target SOC is related to the energy ancillary service and represents the initial or ideal SOC level for the upcoming or schedule grid ancillary service; the grid edge controller charges or discharges the battery to the Target SOC just prior to the grid ancillary.

Dynamic capability of specific grid edge controller parameters allows the datacenter operator to adjust/adapt the operation of the UPS DER as-required to maximize utilization of the DER battery capacity. Were it not for the ability to make such run-time adjustments the operation of the grid edge controller and the UPS would be static in nature forcing the user to live with the particular setup or combination of parameters established at initialization. The datacenter DER with dynamic capability also maximizes the availability of the UPS as DER by avoiding shutting down of the UPS to re-initialize edge controller parameters to align with datacenter operational plans which are dynamic in nature. Additionally, dynamic capability can be enabled or disabled selectively as shown by the checkboxes 350 used to enable and disable dynamic capability on a parameter-by-parameter basis; providing another degree of freedom of control for the DER operator.

The grid edge controller 142 can support a variety of different types of energy ancillary services, such as time of use (TOU) demand charge management. Demand charges can represent a substantial portion of the commercial customers' monthly energy bill. Rate structures vary depending on geographical location, and rates may change due to changes in rate policies and energy programs. Unmanaged power demand can create coincident peak penalties and unexpected/unfavorable site power levels and undesirable rate reclassifications. According to some embodiments, an arrangement along the lines described above with reference to FIG. 1 may be used to turn a UPS and battery equipment resource into a demand charge management device and reduce energy bills and avoid costly penalties.

Figure 4:
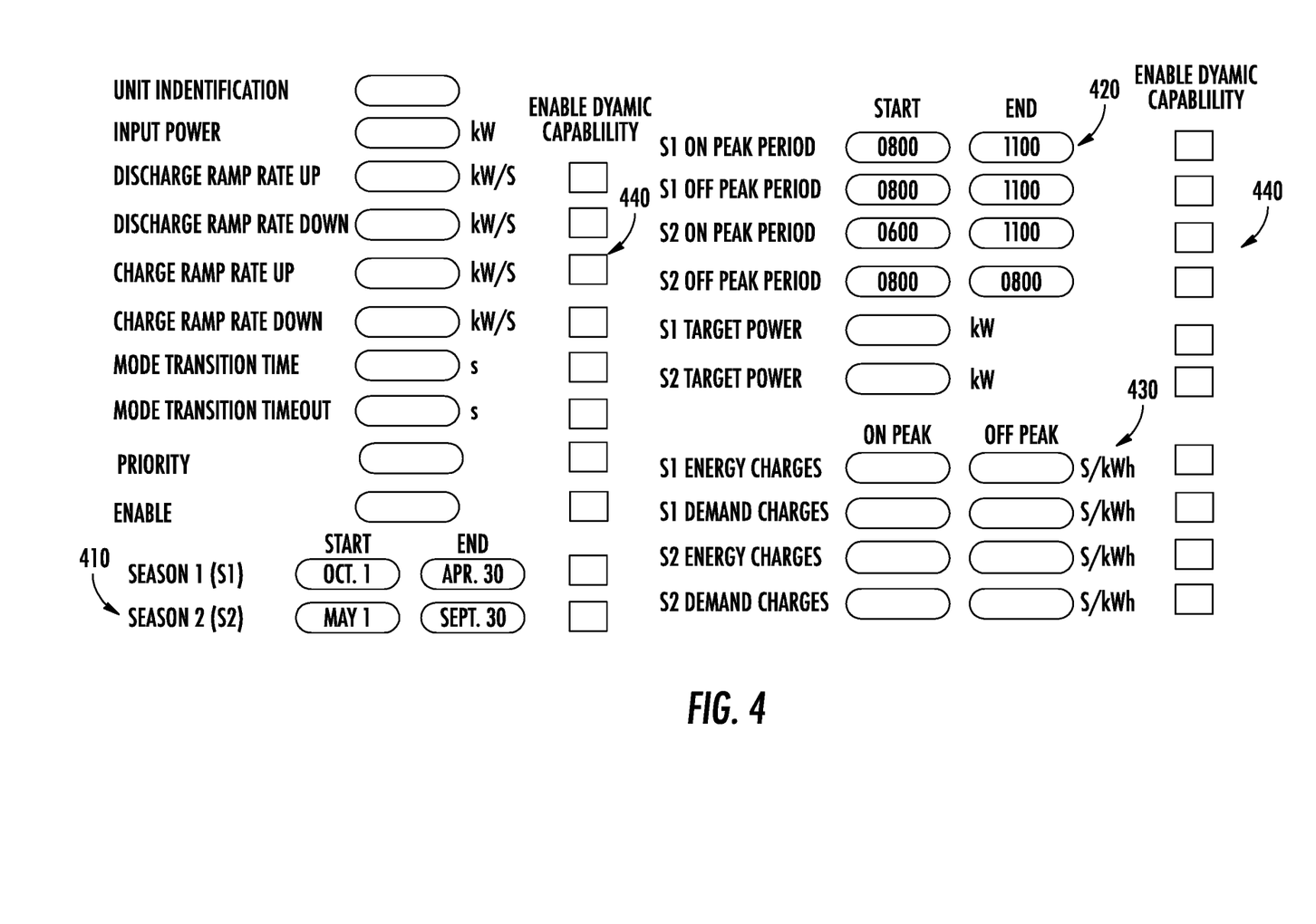

FIG. 4 illustrates an example web page that may be supported by the grid edge controller 142 as part of providing such TOU demand charge management. This web page enables the customer to enter parameters for operation of the grid edge controller 142, allowing the customer to set such values as season date ranges 410, peak and off-peak periods 420 for the various seasons, and energy charges 430 that apply to the various periods, etc. These allow the grid edge controller 142 to be configured to meet the particular needs of the application. As with the parameters shown in FIG. 3, checkboxes 440 or similar input features may be used to selectively allow dynamic reconfiguration of these parameters.

A configuration along the lines of FIG. 1 can also be used to support real-time pricing demand response. A datacenter customer may participate in energy wholesale markets to achieve lowest energy prices. However, at key times, the customer may experience high price volatility typical of wholesale pricing. The grid edge controller 142 of the system of FIG. 1 can process a real-time pricing command from the customer's network, for example, an alert email or other pricing signal from the utility operator and responsively cause the UPS 110 to use energy stored in the battery bank 130 to reduce demand. For example, the grid edge controller 142 may modify its time of use demand charge management profile (e.g., FIG. 4) to reflect such a real time pricing input. The grid edge controller 142 can take advantage of low real-time energy prices in off-peak periods to restore energy to the battery bank. In this manner, the datacenter can avoid higher real-time prices typically seen around periods of high grid congestion and stress. This can result in a lower total cost of operation and may also enable the datacenter to take advantage of capacity reserve payments granted to qualifying loads under special short and interim term distributed resource contracts.

Figure 5:
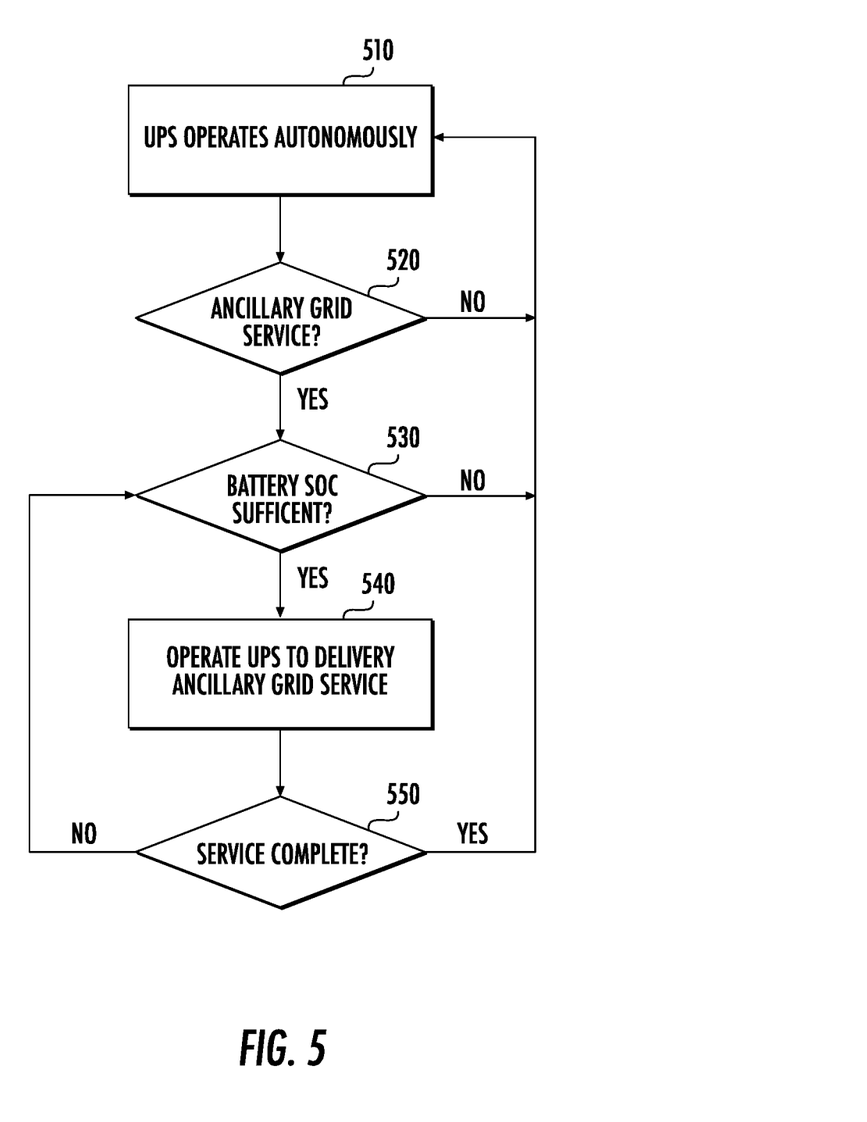
FIG. 5 is a flowchart illustrating operations of a grid edge controller according to some embodiments.

FIG. 5 is a flowchart illustrating exemplary operations of the system of FIG. 1 according to some embodiments. The UPS 110 operates in a normal mode in which it may autonomously react to a power outage or degradation to maintain service to the critical load (block 510). Upon determination that an ancillary grid service is to be provided (block 520), the system may determine whether the battery SOC is appropriate to perform the service without, for example, undermining the ability of the UPS 110 to serve the critical load in the event of an outage or other degradation of service (block 530). If the SOC is not appropriate, the ancillary grid service may not be provided, and the UPS may continue its normal autonomous operation. If the SOC is appropriate, the grid edge controller 142 can cause the UPS to deliver the ancillary grid service (block 540). If the battery SOC becomes inappropriate while providing the ancillary grid service, the system can terminate the service and return to autonomous UPS operation (blocks 550, 530, 510). Similarly, if the service is complete, the system can also return to autonomous UPS operation (blocks 550, 510).

Like other DERs, UPS may be highly distributed as parts of a complex electrical infrastructure typical of a datacenter operation. According to some embodiments, coordination and scheduling of a group of UPS (2, 4, 6, and may be even more) to form/create a total power for the target energy ancillary service may be achieved by creating an aggregation of these devices so that they act as a unitary resource.

A typical datacenter electrical infrastructure is composed of numerous power distribution branches and sub-branches that are powered by a service entrance transformer and switchboards. The branches are designated feeders and sub-feeders that ultimately power (support) downstream information technology equipment (ITE).

The ITE loads can vary depending on datacenter IT operations and are not necessarily coordinated feeder to feeder. The load level on one feeder can be very different from the load level on another by the random nature ITE activity and traffic. However, IT loads can be controlled/managed through virtualization as a function of energy economics.

A key component on the ITE feeder is the UPS, which may be employed to ensure power quality and critical power objectives of the datacenter. Protection of the critical load is the foremost mission of the UPS and, if designed properly, the UPS will stop at nothing to protect that load against source disturbances, including complete outages. ITE loads are joined by mechanical loads on these subject feeders. The mechanical loads can be located either downstream or upstream of the UPS (more typically upstream).

Typically, there are also parallel redundant feeders and UPSs that do not actively support the load and remain on standby during most of their life. These feeders can be viewed as stranded capacity or capacity that would not otherwise be used or tapped save some energy reduction/storage purpose. The investment in redundancy can potentially pay for itself if while in the idle state it is used to support energy services that may be interest.

Along the lines discussed above, a UPS on a particular feeder can be dual-purposed to support energy services desired by datacenter operators and critical load backup. One example service is demand charge management (DCM). A DCM operational logic nay consider as a key input information regarding load level, source voltage, and battery state-of-charge. Each feeder and subfeeder may have a dedicated power meter to provide metered values (power data).

Datacenter power infrastructure feeders typically are not coordinated. For example, the electrical infrastructure may include submeters that remain independent/autonomous readings (data) that is not combined or related in any manner. An aggregated system may identify the parts of the datacenter electrical infrastructure that are working (consuming meaningful power) and have the potential to produce a net energy savings or other energy feature or performance metric. An aggregator can relate (coordinate) target feeder/UPS's (data) such that they operate as one capacity group or groupings.

Figure 6:
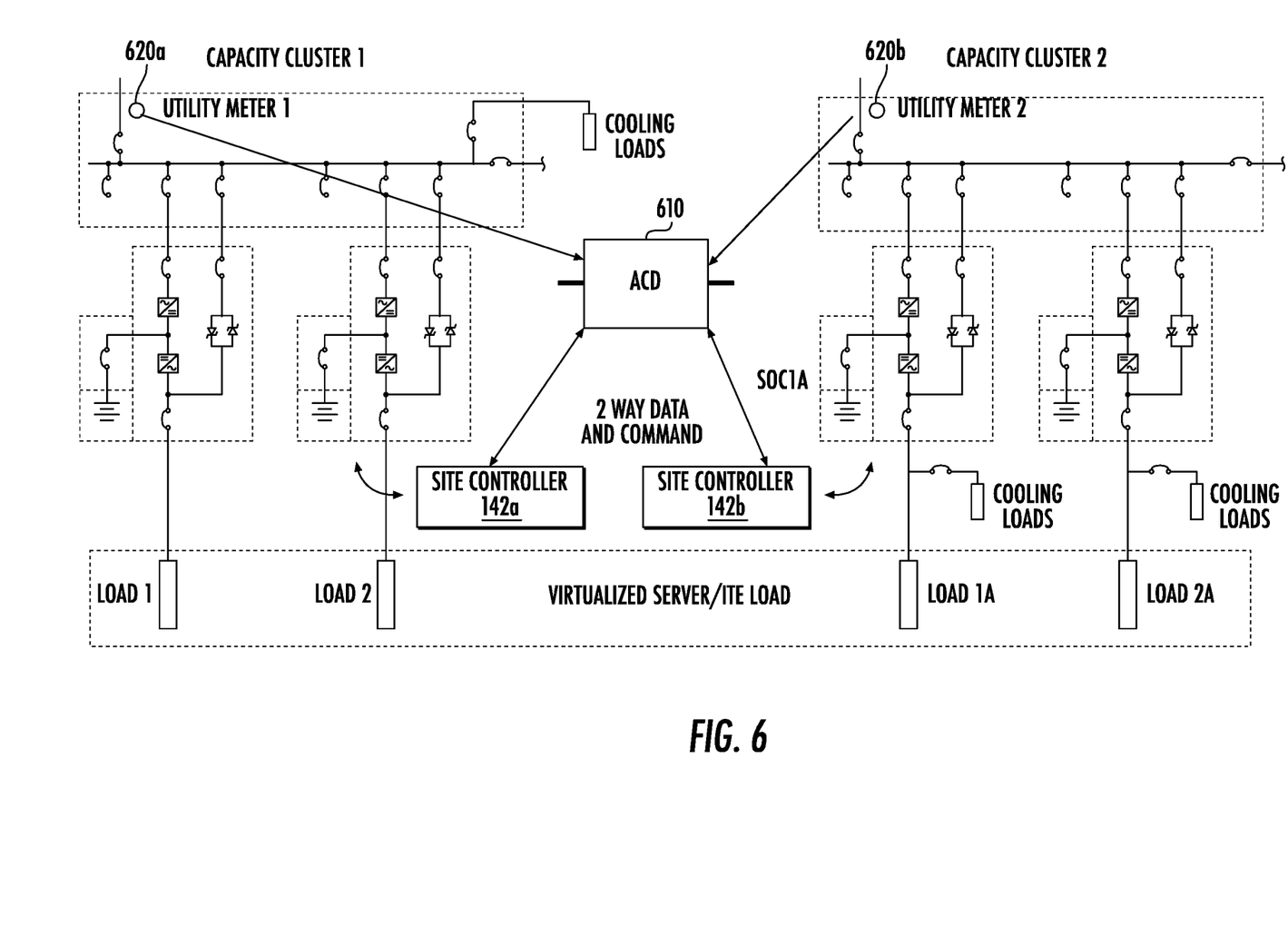
FIG. 6 is a schematic diagram illustrating a system incorporating multiple grid edge controllers and UPSs with an aggregator according to further embodiments.

For example, FIG. 6 illustrates an example of a datacenter power infrastructure including first and second capacity clusters including respective groups of multiple UPSs, each group controlled by a respective grid edge controller 142a, 142b. An aggregator 510 can interact with the multiple grid edge controllers 142a, 142b to enable use of the two capacity clusters and treat them as a combined energy resource, e.g., by coordinating the time of use, battery capacity and other parameters used by the grid edge controllers 142a, 142b.

Time-of-use demand charge management and autonomous frequency regulation according to some embodiments can provide simplifications to the control network where the DER UPS operates both the critical backup and grid ancillary service without input from the grid (e.g., "set and forget"). An autonomous FR mode may be implemented by the UPS sensing the local frequency and pulling/pushing power to some preset frequency/power thresholds (referred to as frequency-watt pairs in the US and frequency containment reserves in Europe).

With the exception of some cooling or facility loads, datacenter load, and IT loads in particular, while fairly constant are also elastic; load elasticity speaks to the ability of the datacenter operation to shift loads to different compute levels. A UPS-based DER according to some embodiments can inform this process and vice-versa. Upstream loads can be controlled/informed/used for "selective self-consumption" wherein behind-the-meter DER's, like a UPS DER along the lines described above, may be restricted (by grid operators and their grid connection rules) to not push power out the facility's point-of-common connection (POC or PCC). The UPS DER can interact with these loads to maintain compliance with grid connection rules/regulations of this sort. In terms for a grid ancillary service, the power of the facility as seen by the grid goes up or down as expected; the requirement of net power production (flowing from the DER to the grid) is not a requirement and may even be a violation. Loads upstream of a DER UPS along the lines described herein may help with this compliance issue.

Some embodiments may be used to implement stacked services, wherein a priority parameter, found on a user interface along the lines described above, can come into play. Stacked services refers to the ability to enable (plan for) more than one type of ancillary service to operate over a period of interest, with one service having a known higher priority over another. Priority levels can be a function of the economic value of one ancillary service over another; the economic value, and hence the priority, can vary during different periods. In general, stacking services can improve system ROI since it can increase the realizable revenue or savings (positive cash flow) of the system.

The drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

That which is claimed:
1. A system comprising:
an uninterruptible power supply (UPS) configured to selectively provide power to a critical load from a grid and an energy storage device; and
a grid edge controller configured to communicate with a controller of the UPS and to cause the UPS to operate the energy storage device as a distributed energy resource (DER) for the grid while preserving autonomous operation of the UPS to serve the critical load, wherein the grid edge controller is configured to provide a user interface that accepts user inputs that set a plurality of state of charge (SOC) thresholds for use of the energy storage device as a DER and to cause the UPS to maintain a SOC of the energy storage device based on the plurality of SOC thresholds.

2. The system of claim 1, wherein the grid edge controller is configured to maintain a critical reserve in the energy storage device that enables the UPS to maintain the critical load.

3. The system of claim 1, wherein the grid edge controller is configured to control the UPS via an application programming interface (API) of the controller of the UPS.

4. The system of claim 1, wherein the grid edge controller is configured to operate the UPS to support frequency regulation and demand response.

5. The system of claim 1, wherein the user interface comprises at least one web page.

6. The system of claim 1, wherein the user interface is configured to accept user settings for a schedule for using the energy storage device as a DER.

7. The system of claim 1, wherein the grid edge controller comprises a first grid edge controller and further comprising an aggregator configured to control the first grid edge controller in concert with at least one second grid edge controller to operate a control a first capacity cluster associated with the first grid edge controller and at least one second capacity cluster associated with the at least one second grid edge controller as a combined energy resource.

8. The system of claim 1, wherein the SOC thresholds include a critical reserve SOC threshold corresponding to a minimum capacity required to serve the critical load, a minimum active SOC threshold corresponding to a minimum capacity for transferring power to the grid from the energy storage, and a maximum active SOC threshold corresponding to a maximum capacity for transferring energy from the grid to the energy storage.

9. The system of claim 1, wherein the grid edge controller is configured to change the SOC thresholds responsive to user inputs to the user interface without requiring re-initialization of the grid edge controller.

10. The system of claim 9, wherein the user interface is configured to accept a user input that enables and disables changes to the SOC thresholds.

11. A system comprising:
an uninterruptible power supply (UPS) configured to selectively provide power to a critical load from a grid and an energy storage device; and
a grid edge controller configured to communicate with a controller of the UPS and to cause the UPS to autonomously maintain continuous power to the load from the grid and the energy storage device and to selectively transfer power between the grid and energy storage device responsive to a grid control input depending on a state of charge (SOC) of the energy storage device, wherein the grid edge controller is configured to provide a user interface that accepts user inputs for setting a plurality of SOC thresholds for use of the energy storage device as a DER and to cause the UPS to maintain a SOC of the energy storage device based on the plurality of SOC thresholds.

12. The system of claim 11, wherein the grid control input comprises a grid operator command and/or an operating parameter of the grid.

13. The system of claim 11, wherein the grid edge controller prevents use of the energy storage device as a DER for the grid responsive to the SOC meeting a predetermined criterion.

14. The system of claim 11, wherein the grid edge controller comprises a first grid edge controller and further comprising an aggregator configured to control the first grid edge controller in concert with at least one second grid edge controller to operate a control a first capacity cluster associated with the first grid edge controller and at least one second capacity cluster associated with the at least one second grid edge controller as a combined energy resource.

15. A method comprising:
- a UPS autonomously operating to selectively provide power to a critical load from a grid and an energy storage device and thereby maintain the critical load;
- a grid edge controller accepting user inputs that set a plurality of state of charge (SOC) thresholds for use of the energy storage as a DER via a user interface; and
- the grid edge controller selectively interacting with a controller of the UPS to operate the energy storage device as a DER for the grid based on a state of charge (SOC) SOC of the energy storage device and the SOC thresholds.

16. The method of claim 15, wherein the grid edge controller selectively interacting with the controller of the UPS comprises maintaining a critical reserve in the energy storage device to enable the UPS to maintain the critical load.

17. The method of claim 15, wherein the grid edge controller selectively interacting with the controller of the UPS comprises the grid edge controller communicating with the UPS via an application programming interface (API) of the controller of the UPS.

18. The method of claim 15, wherein the grid edge controller selectively interacting with the controller of the UPS comprises the grid edge controller causing the UPS to support frequency regulation and demand response.

19. The method of claim 15, wherein the grid edge controller selectively interacting with the controller of the UPS comprises the grid edge controller causing the UPS to autonomously maintain continuous power to the load from the grid and the energy storage device and to selectively transfer power between the grid and energy storage device responsive to a grid control input depending on a state of charge (SOC) the SOC of the energy storage device.

20. The method of claim 19, wherein the grid control input comprises a grid operator command and/or an operating parameter of the grid.

\* \* \* \* \*

UNITED STATES PATENT AND TRADEMARK OFFICE
CERTIFICATE OF CORRECTION

| | | |
|---|---|---|
| PATENT NO. | : 11,239,665 B2 | |
| APPLICATION NO. | : 16/798898 | |
| DATED | : February 1, 2022 | |
| INVENTOR(S) | : Navarro et al. | |

It is certified that error appears in the above-identified patent and that said Letters Patent is hereby corrected as shown below:

On the Title Page

(73) Assignee: Please correct Assignee to read -- Eaton Intelligent Power Limited (IE) --

In the Claims

Column 9, Claim 15, Lines 25-26: Please correct "based on a state of charge (SOC)" to read -- based on a SOC --

Column 10, Claim 19, Lines 21-22: Please correct "depending on a state of charge (SOC) the SOC" to read -- depending on the SOC --

Signed and Sealed this
Tenth Day of May, 2022

Katherine Kelly Vidal
*Director of the United States Patent and Trademark Office*